(12) United States Patent
Huang et al.

(10) Patent No.: US 11,090,597 B2
(45) Date of Patent: Aug. 17, 2021

(54) GLUE-FREE AIRTIGHT FILTERING EQUIPMENT

(71) Applicant: GREENFILTEC TAIWAN LIMITED, Hsinchu (TW)

(72) Inventors: Ming-Wen Huang, Hsinchu (TW); Yi-Hui Yu, Keelung (TW)

(73) Assignee: GREENFILTEC TAIWAN LIMITED, Hsinchu (TW)

( * ) Notice: Subject to any disclaimer, the term of this patent is extended or adjusted under 35 U.S.C. 154(b) by 217 days.

(21) Appl. No.: 16/174,874

(22) Filed: Oct. 30, 2018

(65) Prior Publication Data
US 2019/0160408 A1 May 30, 2019

(30) Foreign Application Priority Data

Nov. 28, 2017 (TW) .................................. 106141266
Nov. 28, 2017 (TW) .................................. 106217637

(51) Int. Cl.
*B01D 46/00* (2006.01)
*B01D 46/12* (2006.01)
*B01D 46/10* (2006.01)

(52) U.S. Cl.
CPC ..... *B01D 46/0006* (2013.01); *B01D 46/0004* (2013.01); *B01D 46/0023* (2013.01); *B01D 46/10* (2013.01); *B01D 46/125* (2013.01); *B01D 2265/06* (2013.01); *B01D 2267/30* (2013.01); *B01D 2267/70* (2013.01)

(58) Field of Classification Search
CPC .............. B01D 46/0006; B01D 46/125; B01D 46/0004; B01D 46/002; B01D 2265/06; B01D 2267/30; B01D 2267/70; B01D 46/0023
See application file for complete search history.

(56) References Cited

U.S. PATENT DOCUMENTS

| | | | | |
|---|---|---|---|---|
| 6,485,538 B1* | 11/2002 | Toyoshima | .......... | B01D 46/521 55/490 |
| 2002/0029549 A1* | 3/2002 | Baumann | ........... | F02M 35/0203 55/385.3 |
| 2007/0227362 A1* | 10/2007 | Parker | ................... | F24F 1/0071 96/224 |
| 2014/0096493 A1* | 4/2014 | Kelmartin | ............ | B01D 46/002 55/482 |

* cited by examiner

*Primary Examiner* — Robert Clemente
(74) *Attorney, Agent, or Firm* — Maschoff Brennan (57) ABSTRACT

Disclosed is glue-free airtight filtering equipment comprising a filter housing, a plurality of filter elements and a plurality of receiving supporting elements, each filter element having a filtering surface, the plurality of filter elements being detachably disposed in the filtering space in a manner that the filtering surface is parallel to the upper surface and the bottom surface of the filter housing, and the plurality of receiving supporting elements allocating on an inner wall of the filter housing and being spaced apart from each other with a designated distance so as to correspondingly receive and support the plurality of filter elements, wherein a gap is provided between the filter element and the inner wall of the filter housing, and the filtering surface of the filter element and the maximum value of the gap satisfy a relational expression.

12 Claims, 8 Drawing Sheets

GLUE-FREE AIRTIGHT FILTERING EQUIPMENT

CROSS-REFERENCE TO RELATED APPLICATIONS

This application claims priority to Taiwanese Application No. 106141266 (application for Invention patent), filed on Nov. 28, 2017, which is incorporated herein by reference in its entirety. This application also claims priority to Taiwanese Application No. 106217637 (application for Utility Model patent), filed on Nov. 28, 2017, which is incorporated herein by reference in its entirety.

FIELD OF THE INVENTION

The present invention relates to a filtering equipment, and more particularly relates to a glue-free airtight filtering equipment.

BACKGROUND OF THE INVENTION

In the field of industrial manufacturing, especially in the semiconductor manufacturing industry, in order to further improve the product yield, clean rooms are widely used for manufacturing products in a clean and pollution-free environment. A filtering equipment, which is a necessary and important facility to achieve cleanliness requirements for the clean room, is implemented by installing a fan and a filtering device at an air inlet of the clean room so as to enable the fan to direct the air to pass through the filtering device such that the air flow is filtered before entering the clean room. The filtering device is usually provided as a box within which a variety of filter screens capable of filtering acid, alkali and organic pollutants are installed.

However, in such a filtering device, the filter screens are adhered to the box via a glue in a fixed manner. It leads an evitable replacement of the entire filtering device once the life time of any one of the filter screens is expired, thereby causing a waste of resources and being not cost-effective. Moreover, in spite that the use of glue in an adhesion is for a reduction of gas leakage for the filtering device, the glue itself is a polymer material, which will release a variety of organic substances into the environment over time so it is unfavorable to meet the requirements for the clean room. In order to avoid the use of glue, a kind of removable filtering device asserted glue-free is launched. However, the gas leakage of such kind of the removable filtering device is unable to meet the industry requirement of less than 10%, and therefore it cannot be well promoted in the industry.

SUMMARY OF THE INVENTION

Accordingly, one objective of the present invention is to provide a glue-free airtight filtering equipment to solve the above technical problems.

In order to overcome the technical problems in prior art, the present invention provides a glue-free airtight filtering equipment, comprising: a filter housing, having a filtering space, an upper surface, a bottom surface and an air flow passage formed by the upper surface, the bottom surface and the filtering space; a plurality of filter elements, each filter element having a filtering surface, the plurality of filter elements being detachably disposed in the filtering space in a manner that the filtering surface is parallel to the upper surface and the bottom surface of the filter housing; and a plurality of receiving supporting elements, allocating on an inner wall of the filter housing and being spaced apart from each other with a designated distance so as to correspondingly receive and support the plurality of filter elements, wherein a gap is provided between the filter element and the inner wall of the filter housing, and a relationship of the filtering surface of the filter element and the gap satisfies the following mathematical formula (1):

$$(X + 2a)(Y + 2a) = \frac{XY}{\sqrt{\frac{162\Delta P}{\rho v_1^2} + 81}} + XY \quad (1)$$

where a denotes the maximum value of the gap, X and Y denote a length and a width of the filtering surface respectively, $\Delta P$ denotes a pressure difference between two sides of the filtering surface in a vertical direction, $\rho$ denotes air density, and $v_1$ denotes a wind speed of intake air flow from the filtering surface.

In one embodiment of the present invention, a glue-free airtight filtering equipment is provided, wherein the relationship of the filtering surface and the gap satisfies the following mathematical formula (2):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.1. \quad (2)$$

In one embodiment of the present invention, a glue-free airtight filtering equipment is provided, wherein the relationship of the filtering surface and the gap satisfies the following mathematical formula (3):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.07. \quad (3)$$

In one embodiment of the present invention, a glue-free airtight filtering equipment is provided, wherein the relationship of the filtering surface and the gap satisfies the following mathematical formula (4):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.05. \quad (4)$$

In one embodiment of the present invention, a glue-free airtight filtering equipment is provided, wherein the relationship of the filtering surface and the gap satisfies the following mathematical formula (5):

$$\frac{2a(X+Y+2a)\sqrt{\frac{2\Delta P}{\rho}+v_1^2}}{2a(X+Y+2a)\sqrt{\frac{2\Delta P}{\rho}+v_1^2}+XYv_1} \leq 0.03. \quad (5)$$

In one embodiment of the present invention, a glue-free airtight filtering equipment is provided, wherein a rib is formed on the inner wall and protrudes from a surface of the inner wall toward the filter element to abut against the filter element, the rib is positional corresponding to the filter element.

In one embodiment of the present invention, a glue-free airtight filtering equipment is provided, wherein a compressible filling element disposed in the gap is further comprised.

In one embodiment of the present invention, a glue-free airtight filtering equipment is provided, wherein the gap is a non-linear gap sandwiched between the inner wall of the filter housing and the filter element.

In one embodiment of the present invention, a glue-free airtight filtering equipment is provided, the glue-free airtight filtering equipment further comprising a cover and a fastener, each receiving supporting element being provided with an extending end extending over the filtering space, each extending end being provided with a fastening hole, the cover being provided with a plurality of openings which are positional corresponding to the plurality of extending ends, the cover being fastened to the filter housing in a manner that the opening is fit to the extending end, the fastener being provided with a body portion and fastening portions whose quantity is corresponding to quantity of the plurality of receiving supporting elements, the fastening portions being extended from the body portion, an interval distance between the neighbor fastening portions being corresponding to an interval distance between the neighbor receiving supporting elements, and the fastener being provided to correspondingly insert the fastening portions into the fastening holes in a manner that the body portion is parallel to a filtering direction so as to fix the plurality of filter elements to the filtering space by the fastener and the cover.

In one embodiment of the present invention, a glue-free airtight filtering equipment is provided, wherein the cover has a cover surface recessed toward the filtering space.

In one embodiment of the present invention, a glue-free airtight filtering equipment is provided, wherein a grip is provided at the cover surface.

In one embodiment of the present invention, a glue-free airtight filtering equipment is provided, wherein the filtering direction is in a gravity direction, and the fastener fastens, by gravity of the fastener, the cover and the receiving supporting element in the gravity direction.

By means of the technical means adopted by the present invention, the gas leakage can be ensured to be lower than the industry requirement. A glue-free airtight filtering equipment of the present invention with a well filtering function can be obtained if the operating environmental parameters of the fan are properly configured. The present invention is with the technical feature that the maximum value of the gap for the glue-free airtight filtering equipment can be obtained by the mathematical formula (1) as long as the parameter of the fan used in the environment is with a constant value and the area, i.e., the length and width, of the filtering surface required is also a constant value. Conversely, the necessary environmental parameters of the fan can also be derived via the mathematical formula (1) when the glue-free airtight filtering equipment has been manufactured with the known constant values in terms of the length, the width and the gap of the filtering surface. Therefore, the glue-free airtight filtering equipment can be really applied in the industry. Furthermore, since the present invention allows the replacement of only partial filter elements each time, all filter elements can be fully and effectively utilized and the replacement cost can be reduced.

BRIEF DESCRIPTION OF THE DRAWINGS

The structure and the technical means adopted by the present invention to achieve the above and other objectives can be best understood by referring to the following detailed description of the preferred embodiments and the accompanying drawings.

DETAILED DESCRIPTION OF THE PREFERRED EMBODIMENTS

The preferred embodiments of the present invention are described in detail below with reference to FIG. 1 to FIG. 8. The description is used for explaining the embodiments of the present invention only, but not for limiting the scope of the claims.

Figure 1:
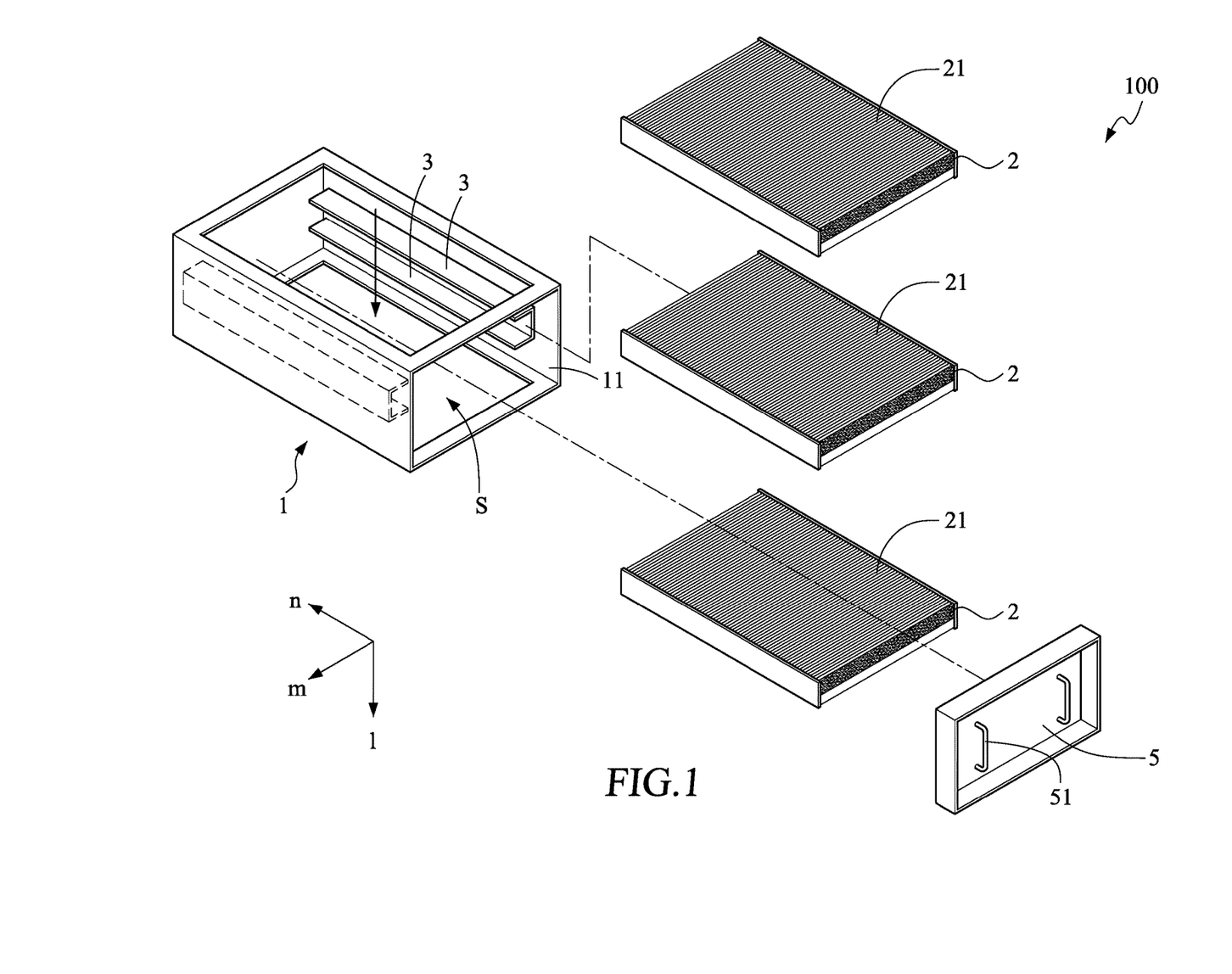
FIG. 1 is a schematic stereogram illustrating a glue-free airtight filtering equipment according to a first embodiment of the present invention.

As shown in FIG. 1, a glue-free airtight filtering equipment 100 according to a first embodiment of the present invention includes a filter housing 1, a plurality of filter elements 2 and a plurality of receiving supporting elements 3.

The filter housing 1 has a filtering space S, and an air flow passage, as indicated by an arrow in FIG. 1, is formed by an upper surface, a bottom surface and the filtering space S of the filter housing 1. In this embodiment, a fan is disposed below the filter housing 1 to evacuate the filtering space S, so that an air flow passes through the filter housing 1 from top to bottom via the air flow passage.

The plurality of filter elements 2, each having a filtering surface 21, are detachably disposed in the filtering space S in a manner that the filtering surface 21 is parallel to the upper surface and the bottom surface of the filter housing 1. Specifically, in this embodiment, the air flow passage is formed by the upper surface, the bottom surface and the filtering space S of the filter housing 1, and by the way that the filtering surface 21 is parallel to the upper surface and the bottom surface of the filter housing, the plurality of filter elements 2 are detachably disposed at these two surfaces of the filter housing 1, so that the air flow flowing in the air flow passage can be filtered by the plurality of filter elements 2.

The plurality of receiving supporting elements 3 allocate on an inner wall 11 of the filter housing 1 and are spaced apart from each other with a designated distance in an upper and down direction l so as to correspondingly receive and support the plurality of filter elements 2. Specifically, in this embodiment, the plurality of receiving supporting elements 3 allocate on a left wall 11 and a right wall 11 of the filter housing 1, which are connected with the upper surface and the bottom surface. The plurality of receiving supporting elements 3 protrude toward the filtering space S in a direction m parallel to the upper surface and the bottom surface of the filter housing 1. The plurality of filter elements 2 sequentially slide to be arranged at the plurality of receiving supporting elements 3 so as to be fastened to the filter housing 1.

Figure 2:
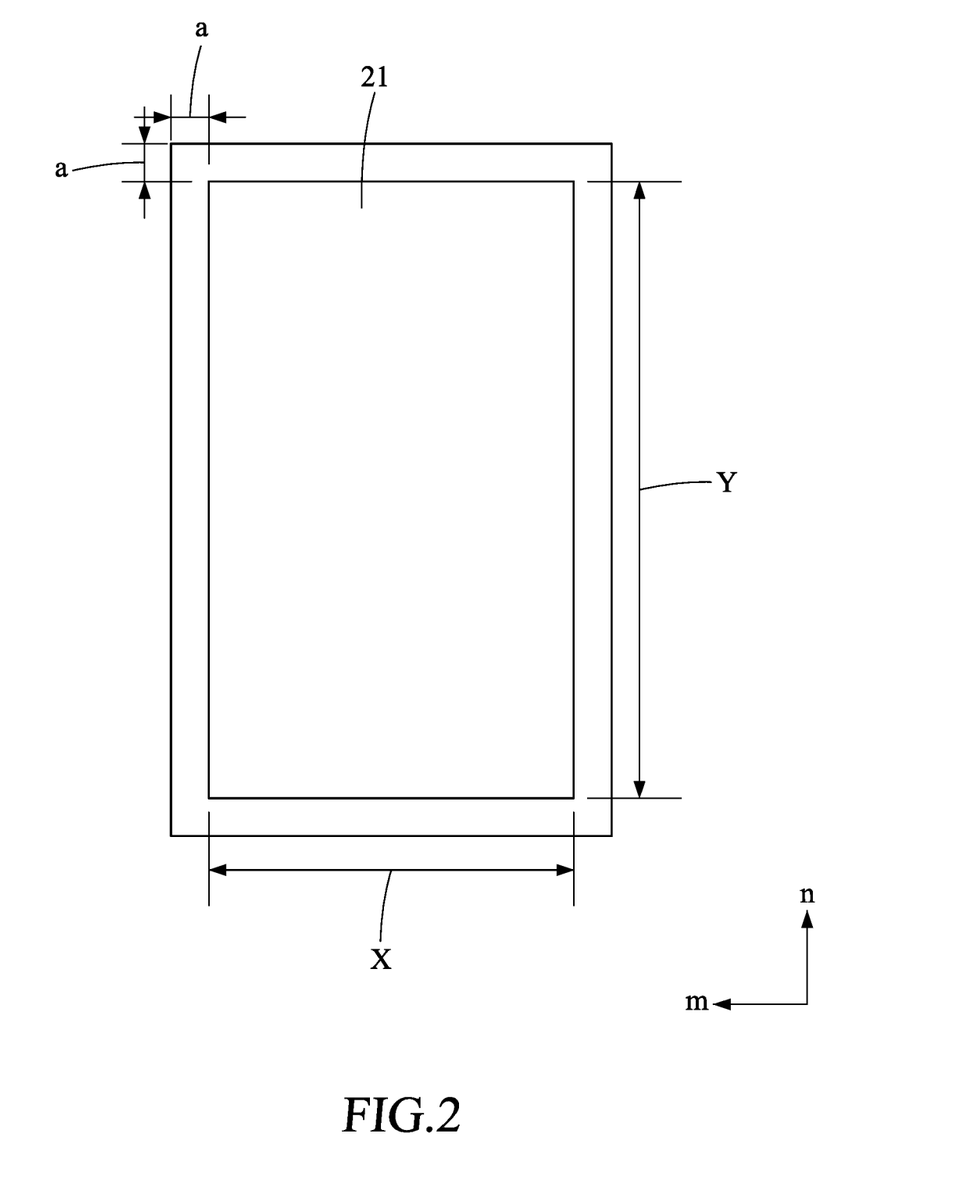
FIG. 2 is a schematic top view illustrating the glue-free airtight filtering equipment according to the first embodiment of the present invention.
Figure 3:
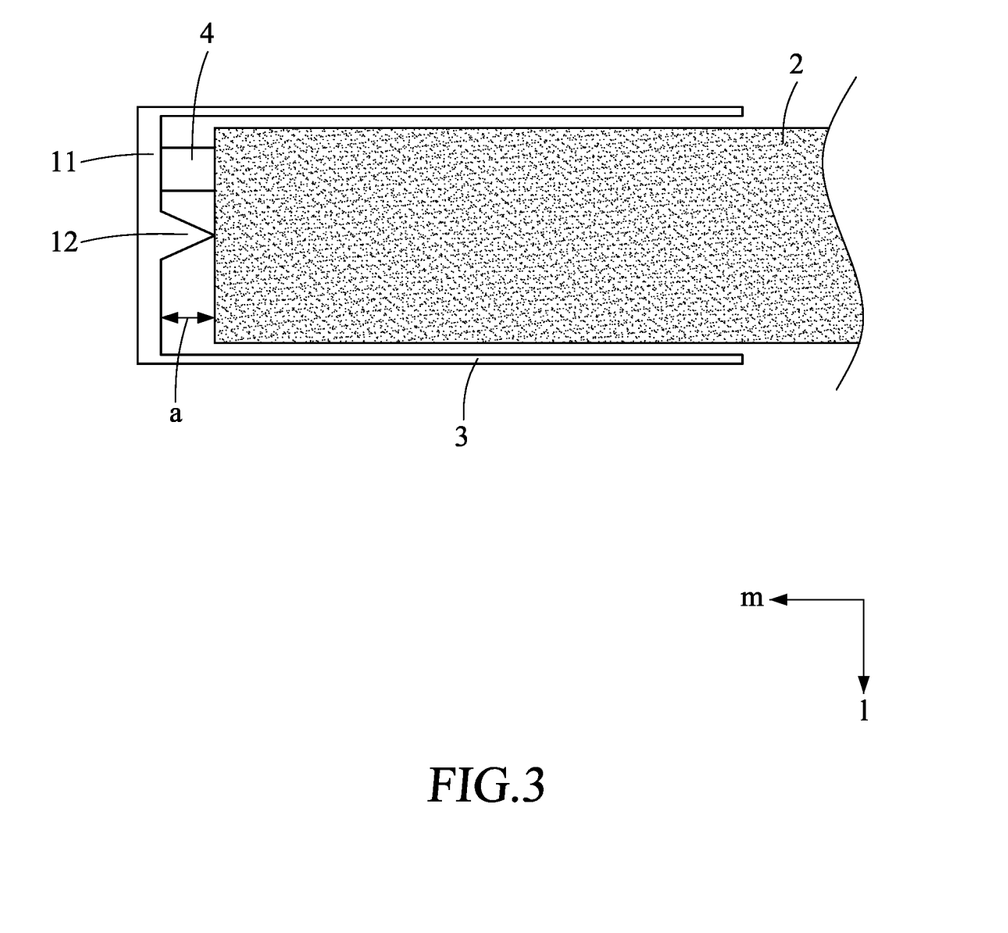
FIG. 3 is a schematic partial section view illustrating the glue-free airtight filtering equipment according to the first embodiment of the present invention.

As shown in FIG. 2 and FIG. 3, the filtering surface 21 of the filter element 2 has a length of X and a width of Y. A gap is provided between the filter element 2 and the inner wall 11 of the filter housing 1, and a relationship of the filtering surface 21 of the filter element 2 and the gap satisfies the following mathematical formula (1):

$$(X+2a)(Y+2a) = \frac{XY}{\sqrt{\frac{162\Delta P}{\rho v_1^2}+81}} + XY \quad (1)$$

where a denotes the maximum value of the gap, $\Delta P$ denotes a pressure difference between two sides of the filtering surface 21 in a vertical direction (the direction l), $\rho$ denotes air density, and $v_1$ denotes a wind speed of intake air flow from the filtering surface 21.

The air density is a known value (1.204 kg/m³ under normal circumstances) and the pressure difference $\Delta P$ and the wind speed $v_1$ are adjustable and can also be fixed parameter values because the pressure difference $\Delta P$ between the two sides of the filtering surface 21 in the vertical direction (the direction l) and the wind speed $v_1$ of intake air flow from the filtering surface 21 are controlled by the fan, and therefore the gas leakage can be ensured less than 10% as long as the gap between the filter element 2 and the inner wall 11 of the filter housing 1 is not more than a. In other words, a glue-free airtight filtering equipment 100 can be properly designed by mainly confirming operating conditions (environmental parameters of the pressure difference, the wind speed, and so on) of the fan for the glue-free airtight filtering equipment 100. The maximum value of the gap for the designed glue-free airtight filtering equipment 100 can be obtained by the mathematical formula (1) when the parameter of the fan used in the environment is a fixed value and the area or the length and width of the filtering surface 21 required is also a fixed value. Conversely, the necessary environmental parameters of the fan can also be derived via the mathematical formula (1) when the glue-free airtight filtering equipment 100 has been manufactured and the length and width of the filtering surface 21 and the gap are known fixed values.

Furthermore, in this embodiment, the relationship of the filtering surface 21 and the gap satisfies the following mathematical formula (2):

$$\frac{2a(X+Y+2a)\sqrt{\frac{2\Delta P}{\rho}+v_1^2}}{2a(X+Y+2a)\sqrt{\frac{2\Delta P}{\rho}+v_1^2}+XYv_1} \leq 0.1. \quad (2)$$

In the mathematical formula (2), the leakage is less than 10% if the gap is less than a.

Furthermore, in this embodiment, the relationship of the filtering surface 21 and the gap satisfies the following mathematical formula (3):

$$\frac{2a(X+Y+2a)\sqrt{\frac{2\Delta P}{\rho}+v_1^2}}{2a(X+Y+2a)\sqrt{\frac{2\Delta P}{\rho}+v_1^2}+XYv_1} \leq 0.07. \quad (3)$$

In the mathematical formula (3), the leakage is less than 7% if the gap is less than a.

Furthermore, in this embodiment, the relationship of the filtering surface 21 and the gap satisfies the following mathematical formula (4):

$$\frac{2a(X+Y+2a)\sqrt{\frac{2\Delta P}{\rho}+v_1^2}}{2a(X+Y+2a)\sqrt{\frac{2\Delta P}{\rho}+v_1^2}+XYv_1} \leq 0.05. \quad (4)$$

In the mathematical formula (4), the leakage is less than 5% if the gap is less than a.

Furthermore, in this embodiment, the relationship of the filtering surface 21 and the gap satisfies the following mathematical formula (5):

$$\frac{2a(X+Y+2a)\sqrt{\frac{2\Delta P}{\rho}+v_1^2}}{2a(X+Y+2a)\sqrt{\frac{2\Delta P}{\rho}+v_1^2}+XYv_1} \leq 0.03. \quad (5)$$

In the mathematical formula (5), the leakage is less than 3% if the gap is less than a.

In one example, the length and the width of the filter element 2 are 0.8 m and 0.485 m respectively, the wind speed of intake air flow is 0.7 m/s, the pressure difference between two sides of the filtering surface 21 in the vertical direction is 250 Pa, and the allowed maximum value a of the gap being 0.575 mm can be obtained when substituting these values into the mathematical formula (1).

In one example, the length and the width of the filter element 2 are 0.8 m and 0.485 m respectively, the wind speed of intake air flow is 0.7 m/s, the pressure difference between two sides of the filtering surface 21 in the vertical direction is 250 Pa, the gap is 0.5 mm, and the leakage being about 8.8% can be obtained when substituting these values into the mathematical formula (2).

In another example, a gap between the inner wall 11 and the filtering surface 21 in length is different from a gap between the inner wall 11 and the filtering surface 21 in width, and a relationship of the filtering surface and the gaps satisfies the following mathematical formula (1a):

$$(X + 2a_x)(Y + 2a_y) = \frac{XY}{\sqrt{\frac{162\Delta P}{\rho v_1^2} + 81}} + XY \tag{1a}$$

wherein $a_x$ denotes the maximum value of the gap between the inner wall 11 and the filtering surface 21 in length and $a_y$ denotes the maximum value of the gap between the inner wall 11 and the filtering surface 21 in width.

Next, the derivation of the aforementioned respective relationships will be further explained.

The following mathematical formula (6) is given based on Bernoulli's principle, wherein $P_1$ and $P_2$ denote the pressure values at two sides of the filter element 2 in the vertical direction 1 respectively, g denotes the gravitational acceleration, $h_1$ and $h_2$ denote the height at two sides of the filter element 2 in the vertical direction respectively, $v_1$ and $v_2$ denote the wind speed at two sides of the filter element 2 in the vertical direction, and ρ denotes air density.

$$P_1 + \rho g h_1 + 1/2 \rho v_1^2 = P_2 + \rho g h_2 + 1/2 \rho v_2^2 \tag{6}$$

Since a difference between $h_1$ and $h_2$ is extremely small to be negligible, the mathematical formula (6) can be rewritten as the following mathematical formula (7):

$$P_1 - P_2 = \Delta P = 1/2 \rho (v_2^2 - v_1^2) \tag{7}$$

Next, considering the principle of mass conservation, the product of the cross-sectional area $A_0$ and the velocity $v_0$ of the air flow and the product of the cross-sectional area A and the velocity v of the air flow should be equal, and the following mathematical formula (8) is given.

$$A_0 v_0 = A v \tag{8}$$

If the gas leakage of 10% is given, the following mathematical formula (9) is derived, wherein $A_1$ denotes the area of the filtering surface 21 and $A_2$ denotes the total area of the gap.

$$A_1 v_1 = 9 A_2 v_2 \tag{9}$$

Based on the mathematical formula (9), the mathematical formula (7) is rewritten as the following mathematical formula (10).

$$\frac{1}{2}\rho\left[\left(\frac{A_1 v_1}{9 A_2}\right)^2 - v_1^2\right] = \Delta P \tag{10}$$

The following mathematical formula (11) can be derived via transposition.

$$\frac{A_1}{A_2} = \sqrt{\frac{162 \Delta P}{\rho v_1^2} + 81} \tag{11}$$

The following mathematical formulas (12) and (13) for $A_1$, the area of the filtering surface 21, and $A_2$, the total area of the gap, can be obtained as referring to FIG. 2.

$$A_1 = XY \tag{12}$$

$$A_2 = (X+2a)(Y+2a) - XY \tag{13}$$

The following mathematical formula (14) is derived by substituting the mathematical formulas (12) and (13) into the mathematical formula (11).

$$\frac{XY}{(X+2a)(Y+2a) - XY} = \sqrt{\frac{162 \Delta P}{\rho v_1^2} + 81} \tag{14}$$

The mathematical formula (1) is obtained via transposition.

$$(X + 2a)(Y + 2a) = \frac{XY}{\sqrt{\frac{162\Delta P}{\rho v_1^2} + 81}} + XY \tag{1}$$

Furthermore, in order to handle the situation that the leakage K is required to be more strictly defined, the following mathematical formula (15) derived from the mathematical formula (9) can be given.

$$\frac{A_2 v_2}{A_1 v_1 + A_2 v_2} = K \tag{15}$$

The following mathematical formula (16) can be derived via the mathematical formulas (12) and (13).

$$\frac{[(X+2a)(Y+2a) - XY] v_2}{[(X+2a)(Y+2a) - XY] v_2 + XY v_1} = K \tag{16}$$

Next, the following mathematical formula (17) is obtained according to the mathematical formula (7).

$$v_2 = \sqrt{\frac{2\Delta P}{\rho} + v_1^2} \tag{17}$$

The following mathematical formula (18) is obtained by substituting the mathematical formula (17) into the mathematical formula (16).

$$\frac{[(X+2a)(Y+2a) - XY]\sqrt{\frac{2\Delta P}{\rho} + v_1^2}}{[(X+2a)(Y+2a) - XY]\sqrt{\frac{2\Delta P}{\rho} + v_1^2} + XY v_1} = K \tag{18}$$

The mathematical formula (18) can be rewritten as the following mathematical formula (19).

$$\frac{2a(X+Y+2a)\sqrt{\frac{2\Delta P}{\rho} + v_1^2}}{2a(X+Y+2a)\sqrt{\frac{2\Delta P}{\rho} + v_1^2} + XY v_1} = K \tag{19}$$

The leakage K can be set to 10%, 7%, 5% or 3%, as required, and a is the maximum value of the gap conforming to the requirement for the leakage K.

As shown in FIG. 3, the glue-free airtight filtering equipment 100 of this embodiment is further provided with a rib 12, the rib 12 is formed on the inner wall 11 and protrudes from a surface of the inner wall 11 toward the filter element 2 to abut against the filter element 2, and the rib is positional corresponding to the filter element. In this way, it can further prevent the air flow from passing through the gap without hindering the installation of the filter element 2, thereby reducing the leakage.

In the glue-free airtight filtering equipment 100, a compressible filling element 4 disposed in the gap is further provided. During the installation of the filter element 2, the compressible filling element 4 can be compressed so as to further prevent the air flow from passing through the gap so as to reduce the leakage.

Furthermore, as shown in FIG. 1, the glue-free airtight filtering equipment 100 of this embodiment is further provided with a cover 5 covering an opening of the filter housing 1 so that the plurality of filter elements 2 can be securely disposed in the filter housing 1 without falling out. Moreover, the cover 5 is provided with a grip 51 for conveniently lifting, moving and carrying the glue-free airtight filtering equipment 100.

Figure 4:
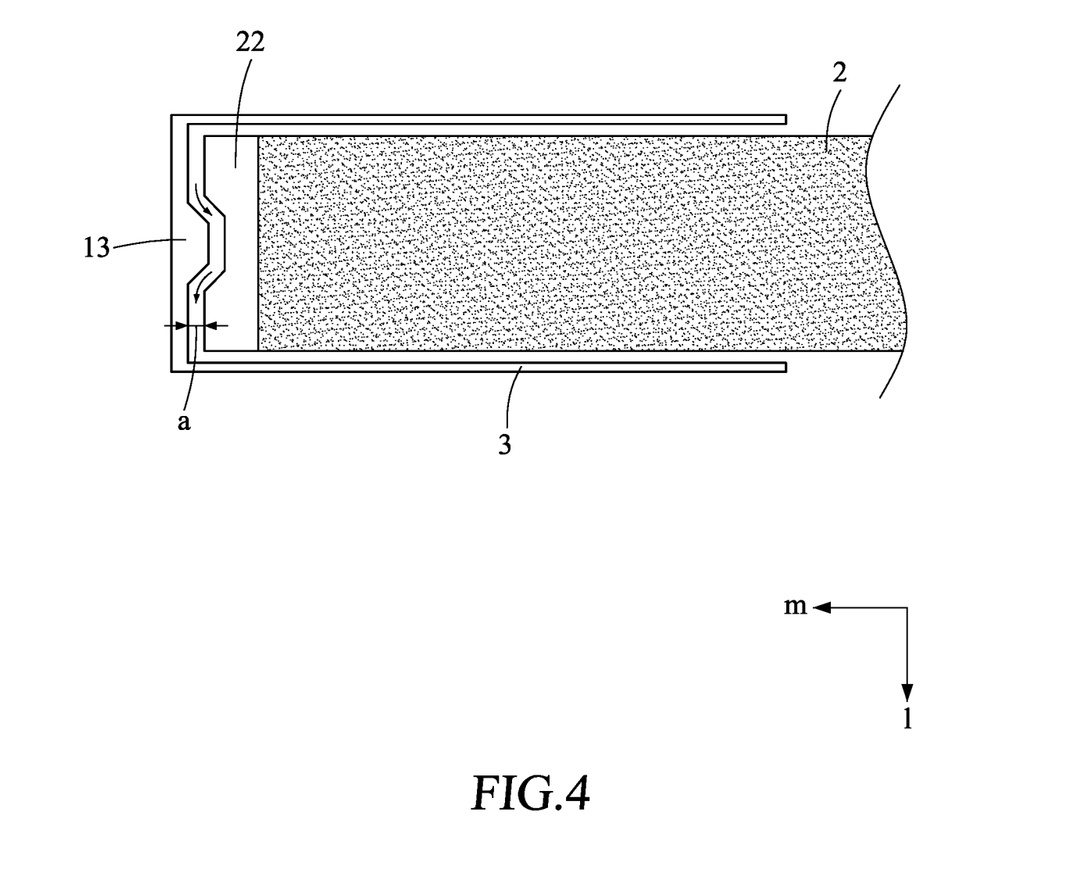
FIG. 4 is a schematic partial section view illustrating a glue-free airtight filtering equipment according to a second embodiment of the present invention.

As shown in FIG. 4, in a second embodiment of the present invention, the gap is a non-linear gap sandwiched between the inner wall 11 of the filter housing 1 and the filter element 2. Specifically, the filter element 2 is provided at a side thereof with an edge portion 22 having an undulating surface in shape correspondence to the inner wall 11 so as to form the non-linear gap in a direction (the direction 1) parallel to the air flow passage. In this way, it can further prevent the air flow from passing through the gap without hindering the installation of the filter element 2, thereby reducing the leakage. The edge portion 22 may be a hard material such as a frame of the filter element 2, or may be a soft or compressible material, and the present invention is not limited thereto.

As mentioned above, compared with a prior art, the glue-free airtight filtering equipment 100 can meet the strict requirements of the gas leakage in the industry, and has various advantages of reducing resource cost and glue-free of the filtering device.

Figure 5:
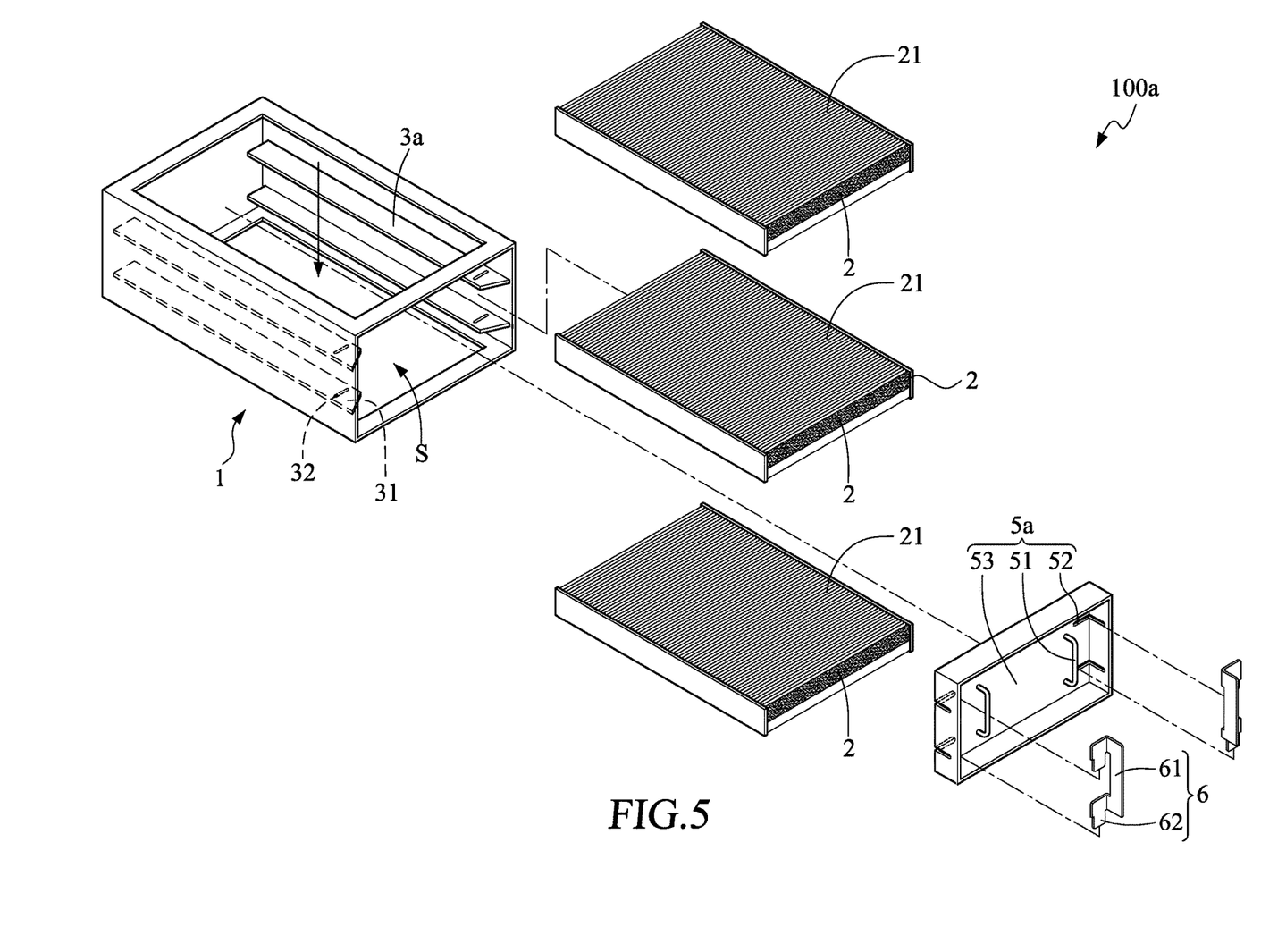
FIG. 5 is a schematic exploded view illustrating a glue-free airtight filtering equipment according to a third embodiment of the present invention.
Figure 6:
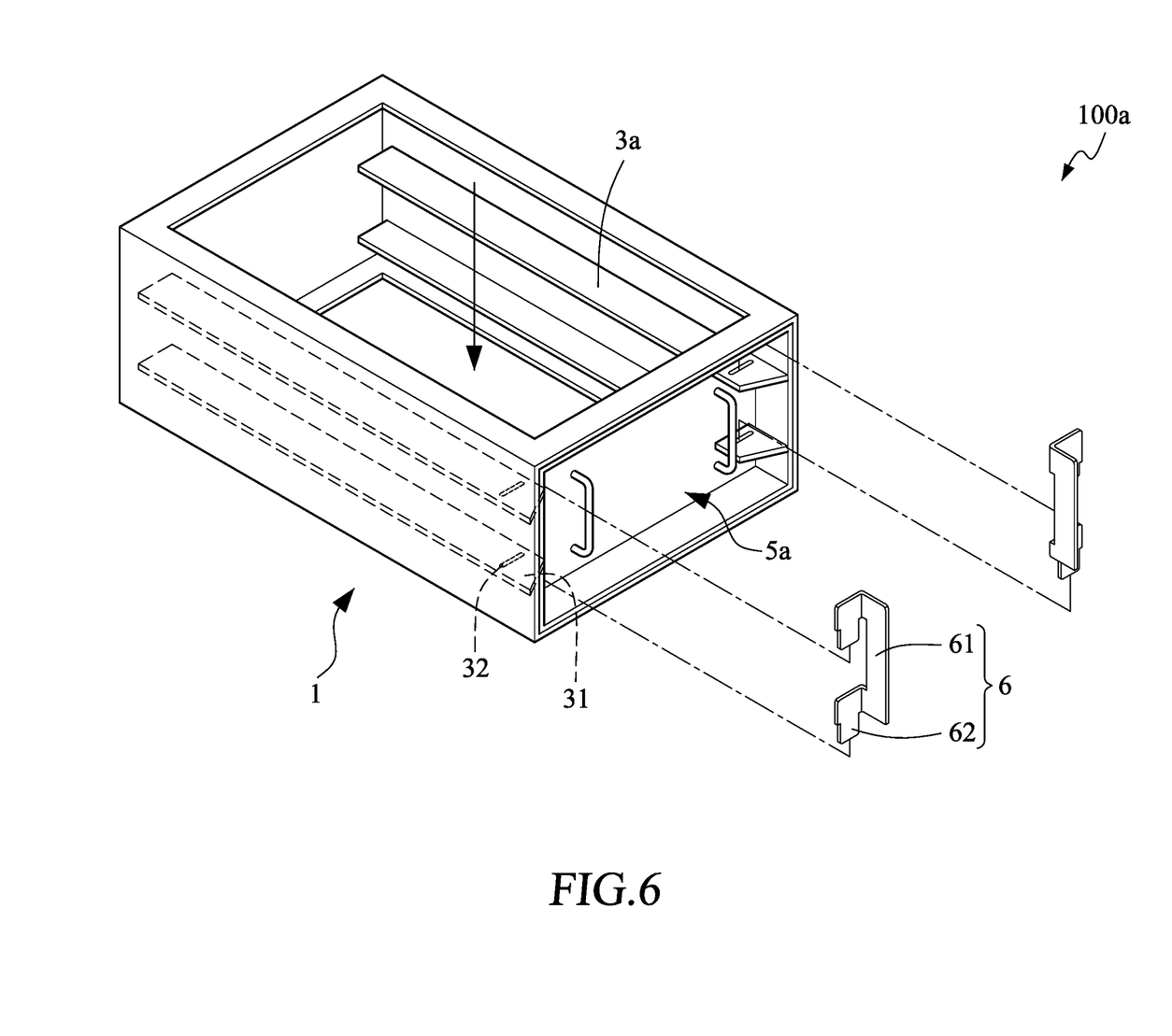
FIG. 6 is a schematic assembly drawing illustrating the glue-free airtight filtering equipment according to the third embodiment of the present invention.

Furthermore, a third embodiment of the present invention is provided. As shown in FIG. 5 and FIG. 6, a glue-free airtight filtering equipment 100a in the present invention includes a filter housing 1, a plurality of filter elements 2, a plurality of receiving supporting elements 3a, a cover 5 and a fastener 6.

The filter housing 1 has a filtering space S and a predetermined filtering direction (as indicated by an arrow in FIG. 5 and FIG. 6). In this embodiment, a fan is disposed below the filter housing 1 to evacuate the filtering space S, so that an air flow passes through the filter housing 1 from top to bottom along the filtering direction.

The plurality of receiving supporting elements 3a are provided to receive and support the plurality of filter elements 2. The plurality of receiving supporting elements 3a are installed in parallel in the filtering space S and are spaced apart from each other with a designated distance, and the filter elements 2 are slidably disposed one by one at the plurality of receiving supporting elements 3a in a direction parallel thereto. Each receiving supporting element 3a is provided with an extending end 31 extending over the filtering space S, and each extending end 31 is provided with a fastening hole 32.

The cover 5 is provided with a plurality of openings 52 which are positional corresponding to the plurality of extending ends 31. As shown in FIG. 6, the cover 5 is fastened to the filter housing 1 in a manner that the opening 52 is fit to the extending end 31, and thereby the plurality of filter elements 2 can be securely disposed in the filter housing 1 without falling out. Moreover, the cover 5 is provided with a grip 51 for conveniently lifting, moving and carrying the glue-free airtight filtering equipment 100a. In this embodiment, the cover 5 further has a cover surface 53 recessed toward the filtering space S.

The fastener 6 is provided with a body portion 61 and fastening portions 62 whose quantity is corresponding to quantity of the plurality of receiving supporting elements 3a, the fastening portions 62 are extended from the body portion 61, an interval distance between the neighbor fastening portions 62 is corresponding to an interval distance between the neighbor receiving supporting elements 3a, and the fastener 6 is provided to correspondingly insert the fastening portions 62 into the fastening holes 32 in a manner that the body portion 61 is parallel to the filtering direction so as to fix the plurality of filter elements 2 to the filtering space S by the fastener 6 and the covers. In this embodiment, the filtering direction is in a gravity direction, and the fastener 6 fastens, by gravity of the fastener 6, the cover 5 and the receiving supporting element 3a in the gravity direction so as to secure the plurality of filter elements 2.

According to the glue-free airtight filtering equipment 100a in the present invention, the filter element 2 can be secured to the filtering space S of the filter housing 1 so as to prevent the filter element 2 from vibrating, slipping or falling off due to the wind speed, thereby ensuring the filter quality.

Figure 7:
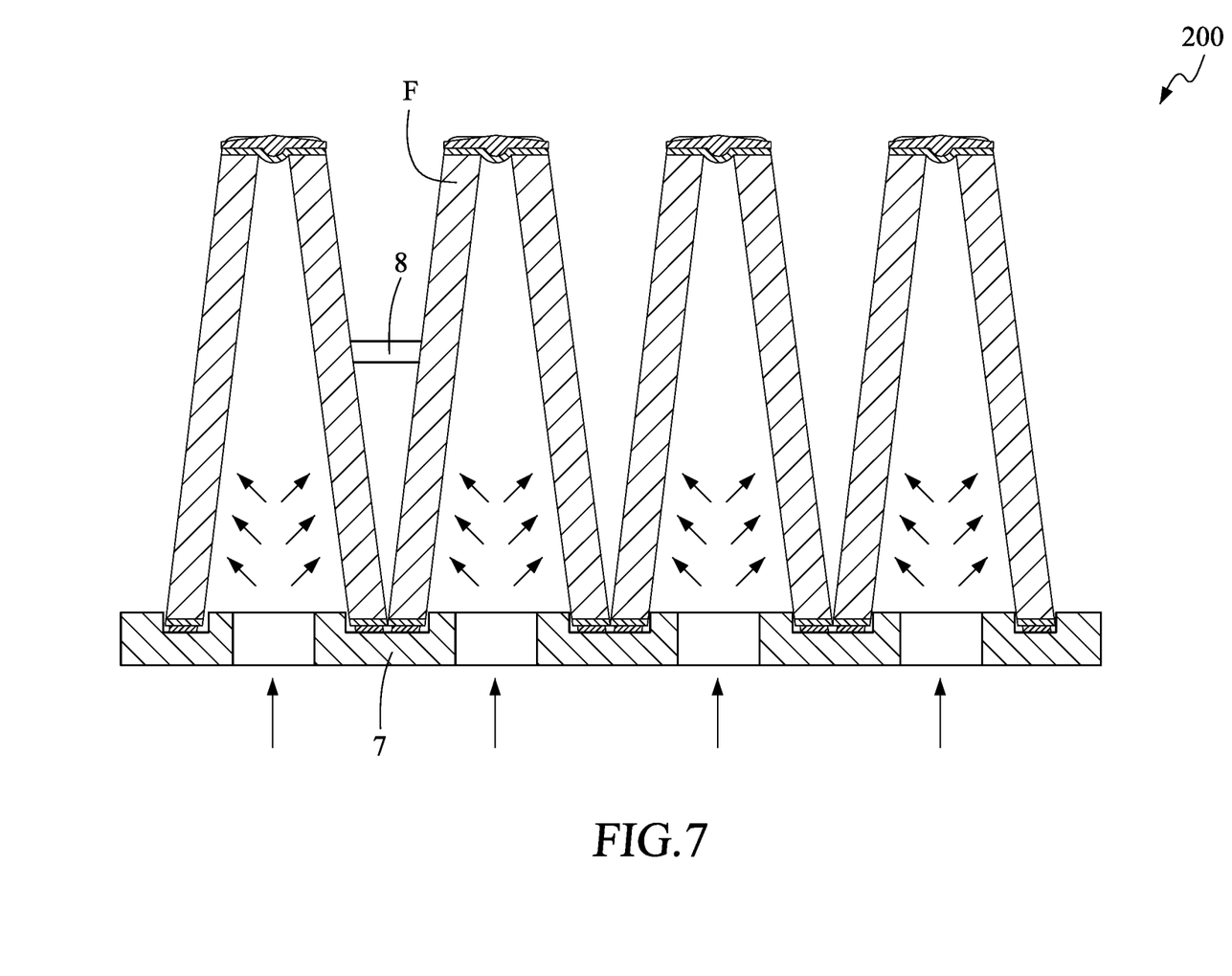
FIG. 7 is a schematic section view illustrating a glue-free airtight filtering equipment according to a fourth embodiment of the present invention.
Figure 8:
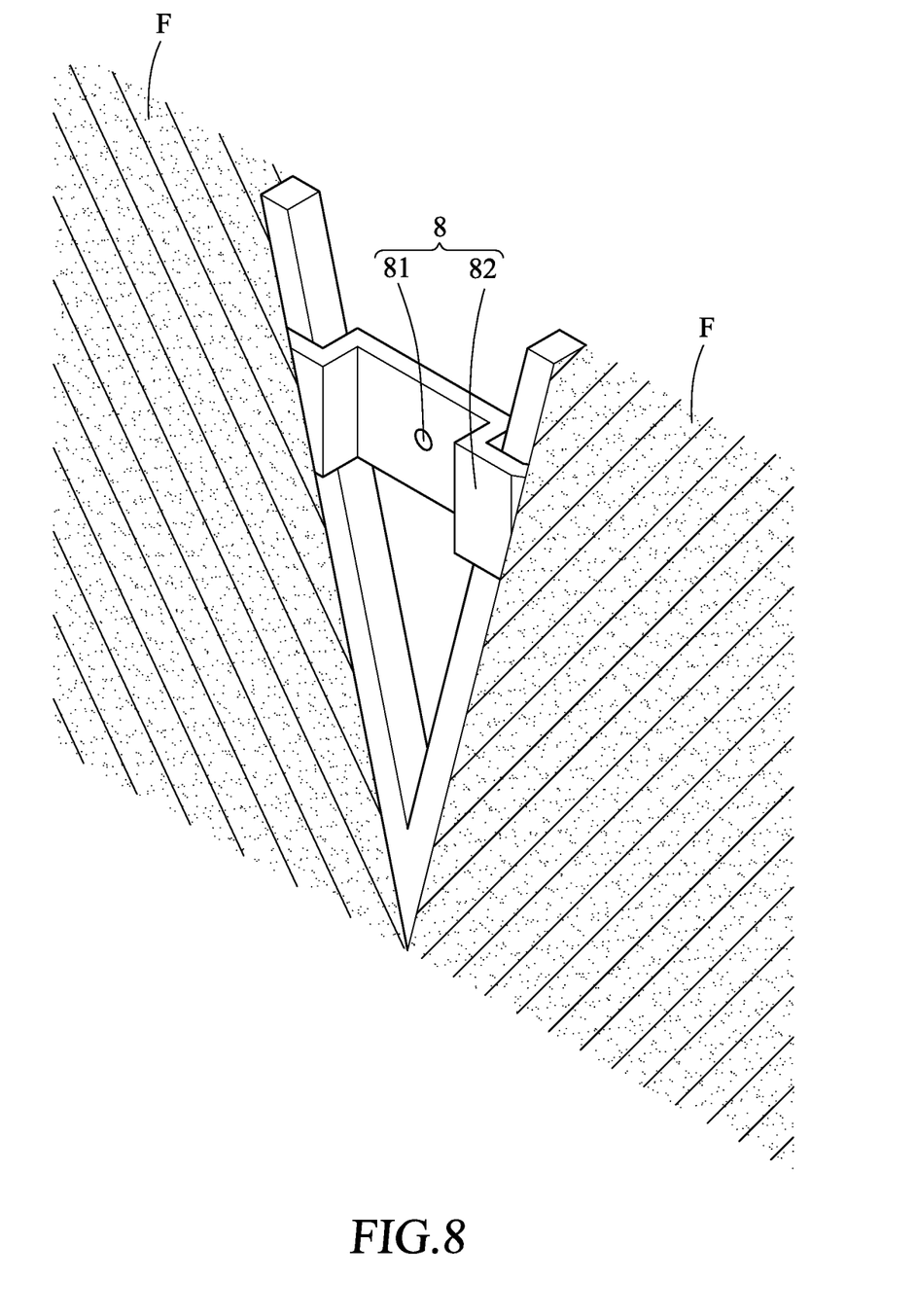
FIG. 8 is a schematic stereogram illustrating the glue-free airtight filtering equipment according to the fourth embodiment of the present invention.

Furthermore, as shown in FIG. 7 and FIG. 8, a fourth embodiment of the present invention is provided. In a glue-free airtight filtering equipment 200, a plurality of filter elements F may be disposed at receiving supporting elements 7, and the filter elements F are arranged in a V-shape on the receiving supporting elements 7. A fastener 8 is disposed between the filter elements F.

The fastener 8 is provided with a bolt hole 81 and a sliding portion 82, wherein the bolt hole 81 is provided for fixing the fastener 8 to a bottom plate of the glue-free airtight filtering equipment 200 by means of a fixing element of a screw. The sliding portion 82 is in shape correspondence with a side strip of the filter element F and is slidable on the side strip of the V-shape arranged filter elements F. The filter elements F can be fixed in the glue-free airtight filtering equipment 200 by the fastener 8 in a manner of sliding the sliding portion 82 to be tight and using the bolt hole 81 to secure the fastener 8.

The above description is only an explanation of the preferred embodiments of the present invention. One having ordinary skill in the art can make various modifications according to the above description and the claims defined below. However, those modifications shall still fall within the scope of the present invention.

What is claimed is:

1. A method of manufacturing a glue-free airtight filtering equipment, comprising:
providing a filter housing having a filtering space, an upper surface, a bottom surface and an air flow passage formed by the upper surface, the bottom surface and the filtering space, wherein the filter housing is disposed in a predetermined disposal environment having a predetermined pressure difference in a vertical direction of the filter housing, a predetermined air density, and a predetermined wind speed of an intake air flow in the vertical direction;

providing a plurality of filter elements, each filter element having a filtering surface, the plurality of filter elements being detachably disposed in the filtering space in a manner that the filtering surface is parallel to the upper surface and the bottom surface of the filter housing to receive the intake air flow; and providing a plurality of receiving supporting elements allocating on an inner wall of the filter housing and being spaced apart from each other with a designated distance so as to correspondingly receive and support the plurality of filter elements, wherein a gap is provided between each filter element and the inner wall of the filter housing corresponding thereto, and a relationship of the filtering surface of the filter element and the gap satisfies the following mathematical formula (1):

$$(X + 2a)(Y + 2a) = \frac{XY}{\sqrt{\frac{162\Delta P}{\rho v_1^2} + 81}} + XY. \tag{1}$$

where a denotes the maximum value of the gap, X and Y denote a length and a width of the filtering surface respectively, $\Delta P$ denotes the predetermined pressure difference in the vertical direction, $\rho$ denotes the predetermined air density, and v1 denotes the predetermined wind speed of the intake air flow from the filtering surface.

2. The method of manufacturing the glue-free airtight filtering equipment as claimed in claim 1, wherein the relationship of the filtering surface and the gap satisfies the following mathematical formula (2):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.1. \tag{2}$$

3. The method of manufacturing the glue-free airtight filtering equipment as claimed in claim 2, wherein the relationship of the filtering surface and the gap satisfies the following mathematical formula (3):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.7. \tag{3}$$

4. The method of manufacturing the glue-free airtight filtering equipment as claimed in claim 3, wherein the relationship of the filtering surface and the gap satisfies the following mathematical formula (4):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.5. \tag{4}$$

5. The method of manufacturing the glue-free airtight filtering equipment as claimed in claim 4, wherein the relationship of the filtering surface and the gap satisfies the following mathematical formula (5):

$$\frac{2a(X + Y + 2a)\sqrt{\frac{2\Delta P}{\rho} + v_1^2}}{2a(X + Y + 2a)\sqrt{\frac{2\Delta P}{\rho} + v_1^2} + XYv_1} \leq 0.3. \tag{5}$$

6. The method of manufacturing the glue-free airtight filtering equipment as claimed in claim 1, wherein a rib is formed on the inner wall and protrudes from a surface of the inner wall toward the filter element to abut against the filter element, the rib is positional corresponding to the filter element.

7. The method of manufacturing the glue-free airtight filtering equipment as claimed in claim 1, further comprising: providing a compressible filling element disposed in the gap.

8. The method of manufacturing the glue-free airtight filtering equipment as claimed in claim 1, wherein the gap is a non-linear gap sandwiched between the inner wall of the filter housing and the filter element.

9. The method of manufacturing the glue-free airtight filtering equipment as claimed in claim 1, further comprising: providing a cover and a fastener, each receiving supporting element being provided with an extending end extending over the filtering space, each extending end being provided with a fastening hole, the cover being provided with a plurality of openings which are positional corresponding to the plurality of extending ends, the cover being fastened to the filter housing in a manner that the opening is fit to the extending end, the fastener being provided with a body portion and fastening portions whose quantity is corresponding to quantity of the plurality of receiving supporting elements, the fastening portions being extended from the body portion, an interval distance between the neighbor fastening portions being corresponding to an interval distance between the neighbor receiving supporting elements, and the fastener being provided to correspondingly insert the fastening portions into the fastening holes in a manner that the body portion is parallel to a filtering direction so as to fix the plurality of filter elements to the filtering space by the fastener and the cover.

10. The method of manufacturing the glue-free airtight filtering equipment as claimed in claim 9, wherein the cover has a cover surface recessed toward the filtering space.

11. The method of manufacturing the glue-free airtight filtering equipment as claimed in claim 10, wherein a grip is provided at the cover surface.

12. The method of manufacturing the glue-free airtight filtering equipment as claimed in claim 9, wherein the filtering direction is in a gravity direction, and the fastener fastens, by gravity of the fastener, the cover and the receiving supporting element in the gravity direction.

* * * * *